United States Patent [19]

Murata et al.

[11] Patent Number: 4,906,965
[45] Date of Patent: Mar. 6, 1990

[54] PLATINUM TEMPERATURE SENSOR

[75] Inventors: Tsuneo Murata, Kyoto, Japan; Walter Gottshling, Schwabach, Fed. Rep. of Germany

[73] Assignee: Murata Manufacturing Co., Ltd., Japan

[21] Appl. No.: 239,200

[22] Filed: Aug. 31, 1988

[30] Foreign Application Priority Data

Sep. 4, 1987 [JP] Japan ................................ 62-222867

[51] Int. Cl.$^4$ ............................................. H01C 3/04
[52] U.S. Cl. ..................................... 338/25; 338/28; 29/610.1; 29/612
[58] Field of Search ................... 338/25, 28, 30, 22 R; 29/610.1, 612

[56] References Cited

U.S. PATENT DOCUMENTS 3,781,749 12/1973 Iles et al. .
3,845,443 10/1974 Fisher .
4,028,657 6/1977 Reichelt .
4,050,052 9/1977 Reichelt et al. .
4,146,957 4/1979 Toenshoff .
4,222,025 9/1980 Iles et al. ............................. 338/25
4,278,828 7/1981 Brixy et al. ....................... 338/28 X

FOREIGN PATENT DOCUMENTS 1546091 5/1979 United Kingdom .

Primary Examiner—Bruce A. Reynolds
Assistant Examiner—Marvin M. Lateef
Attorney, Agent, or Firm—Ostrolenk, Faber, Gerb & Soffen

[57] ABSTRACT

A platinum temperature sensor includes a sensor body formed of a cylindrically rolled plate-type ceramic sheet and a platinum resistance pattern provided on the surface of the ceramic sheet. The platinum resistance pattern is provided on the inner or outer surface of the ceramic sheet. The sensor may further include lead wires, and the ceramic sheet may have through holes for lead wires, which are conductively connected to both ends of the platinum resistance pattern. The lead wires are connected to the platinum resistance pattern. The sensor may further include resistance regulating lines provided on the outer surface of the ceramic sheet, and the ceramic sheet may have through holes reaching the intermediate portion of the platinum resistance pattern. The resistance regulating lines are connected to the platinum resistance pattern through a plurality of said through holes, and may be selectively cut to adjust the resistance of the platinum resistance pattern.

17 Claims, 3 Drawing Sheets

PLATINUM TEMPERATURE SENSOR

BACKGROUND OF THE INVENTION

1. Field of the Invention

The present invention relates to a platinum temperature sensor, and more particularly, it relates to a platinum temperature sensor employing a platinum resistance thermometer.

2. Description of the Prior Art

Platinum, being chemically stable and having high temperature dependency of electrical resistance, is employed as to a material for a temperature sensor. In a conventional platinum temperature sensor, a platinum wire is spirally wound on an insulator, or a platinum resistance pattern is formed as a thick or thin film on a single plate-type alumina substrate, as shown in U.S. Pat. No. 4,028,657, 4,050,052 or 3,781,749.

However, the winding type platinum temperature sensor is high in cost, its size cannot be sufficiently reduced, and high resistance values cannot be attained. In the platinum temperature sensor employing a single alumina substrate, on the other hand, the size must be increased in order to attain a high resistance value, and a high resistance value cannot be attained if the size is reduced.

U.S. Pat. No. 3,845,443 discloses a sensor which comprises a cylindrical body and a platinum resistance pattern provided on the surface of the body. In such a sensor, however, pattern formation is difficult since the platinum resistance pattern must be formed on a curved surface, whereby the pattern is restricted in variety.

SUMMARY OF THE INVENTION

An object of the present invention is to obtain a small-sized platinum temperature sensor having a high resistance value at a low cost.

A platinum temperature sensor according to the present invention comprises a sensor body formed of a cylindrically rolled plate-type ceramic sheet and a platinum resistance pattern provided on the surface of the ceramic sheet.

The platinum resistance pattern may be applied to either the inner or outer surface of the ceramic sheet. The ceramic sheet may be wound on a central core. Further, multiple ceramic sheets may be rolled up together.

This platinum temperature sensor measures temperature according to linear variations of the electrical resistance of the platinum resistance pattern, which serves as the temperature sensing element, caused by temperature change.

Since the platinum temperature sensor according to the present invention employs the sensor body formed of the cylindrically rolled plate-type ceramic sheet and the platinum resistance pattern provided on the surface of the ceramic sheet, the cost is reduced as compared with the conventional winding type platinum temperature sensor, with reduction in size and increase in resistance.

Further, since the ceramic sheet provided with the platinum resistance pattern is rolled up in the form of a cylinder, the surface area of the ceramic sheet, to which the platinum resistance pattern is applied, is increased as compared with the conventional platinum temperature sensor employing a plate-type alumina substrate. In addition, since the platinum resistance pattern is provided on the plate-type ceramic sheet, the pattern can be easily formed in an appropriate pattern configuration.

Thus, according to the present invention, a platinum temperature sensor having smaller size and higher resistance can be readily obtained at a low cost.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
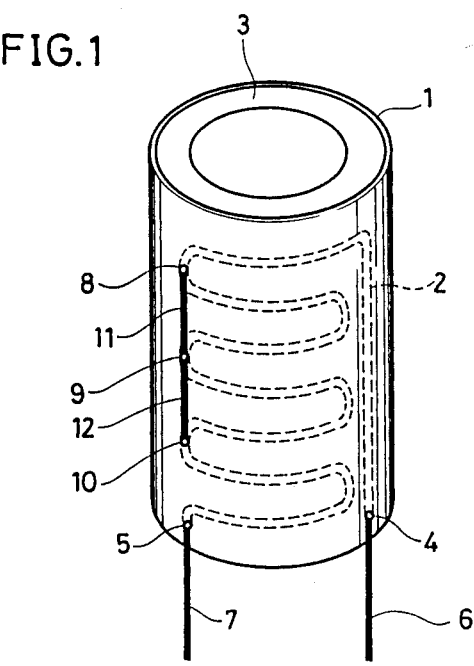
FIG. 1 is a perspective view showing an embodiment of the present invention.

FIG. 1 is a perspective view showing an embodiment of the present invention. Referring to FIG. 1, a platinum temperature sensor comprises a cylindrically rolled ceramic sheet 1 and a platinum resistance pattern 2 applied to the inner surface of the ceramic sheet 1.

The ceramic sheet 1 is wound on the outer side surface of a core 3 and is cofired with the core 3. The core 3 is a cylindrical member which is formed of the same material as the ceramic sheet 1, and is thicker than the ceramic sheet 1. The ceramic sheet 1 and the core 3 are made of high purity alumina. The ceramic sheet 1 thus wound on the outer side surface of the core 3 is substantially cylindrical, and the platinum resistance pattern 2 is disposed between the ceramic sheet 1 and the core 3. The platinum resistance pattern 2, having a first end located at a lower end portion of the ceramic sheet 1, is upwardly extended from the first end and then bent in a zigzag manner so that its second end is also at the lower end portion of the ceramic sheet 1. The ceramic sheet 1 has radial through holes 4 and 5 in portions corresponding to both ends of the platinum resistance pattern 2. Lead wires 6 and 7 are respectively connected to both end portions of the platinum resistance pattern 2 through the through holes 4 and 5, by silver baking.

The ceramic sheet 1 is further provided with radial through holes 8, 9 and 10 in positions corresponding to bent portions of the platinum resistance pattern 2 formed in a zigzag manner. Resistance adjusting lines 11 and 12 are applied/fired onto the outer surface of the ceramic sheet 1 between the through holes 8, 9 and 10. The bent portions of the platinum resistance pattern 2 are electrically connected with each other by the resistance adjusting lines 11 and 12 through the through holes 8, 9 and 10.

The platinum temperature sensor is disposed in an electrical circuit for temperature measurement by the Wheatstone bridge method or the constant current process, for example. The platinum resistance pattern 2 serves as a temperature sensing element whose electrical resistance changes linearly with temperature, thereby measuring the temperature of an object. The platinum resistance pattern 2, being sealed by the ceramic sheet 1 and the core 3, does not deteriorate due to exposure to the atmosphere and is excellent in moisture resistance.

The resistance of the platinum resistance pattern 2 can be regulated by cutting the resistance adjusting lines 11 and 12. After such resistance adjustment, the through holes 8, 9 and 10 and the resistance adjusting lines 11 and 12 may be covered by a ceramic slurry or glass paste, thereby further improving resistance against the atmosphere and moisture.

Figure 2:
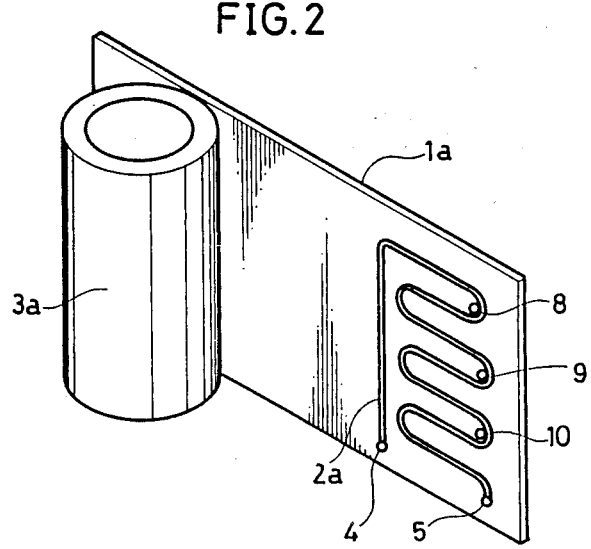
FIG. 2 is a perspective view showing the process of manufacturing the embodiment shown in FIG. 1.

A method of manufacturing the platinum temperature sensor of this embodiment will now be described. First, a ceramic green column 3a is prepared as shown in FIG. 2. Further, a ceramic green sheet 1a in the form of a rectangular flat plate is prepared and printed with a platinum paste pattern 2a on one major surface. The ceramic green sheet 1a is then provided with the through holes 4, 5, 8, 9 and 10 in positions corresponding to the end portions and bent portions of the platinum paste pattern 2a. Thereafter, the ceramic green sheet 1a is wound on the outer peripheral surface of the ceramic green column 3a, with the platinum paste pattern 2a being inside. Then the ceramic green sheet 1a is cofired with the ceramic green column 3a. The lead wires 6 and 7 are connected to both ends of the platinum resistance pattern 2 through the through holes 4 and 5. The resistance adjusting lines 11 and 12 are provided on the outer peripheral surface of the ceramic sheet 1 by silver baking to interconnect the through holes 8, 9 and 10, thereby conductively coupling the portions of the platinum resistance pattern 2 corresponding to the through holes 8, 9 and 10 with each other. Thus, the platinum temperature sensor shown in FIG. 1 is obtained.

Figure 3:
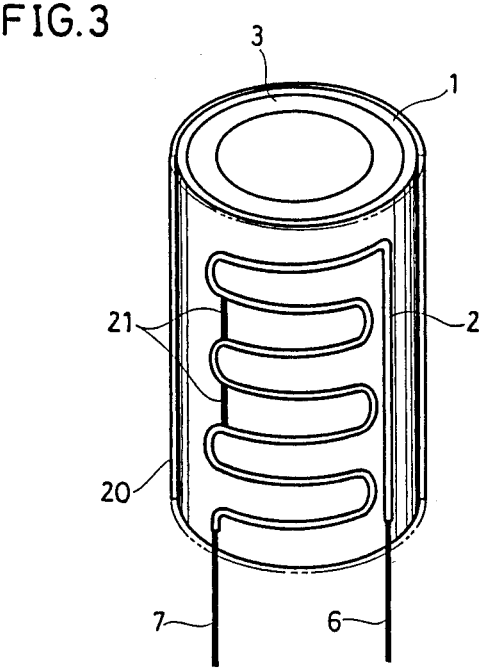
FIG. 3 is a perspective view showing another embodiment of the present invention.
Figure 4:
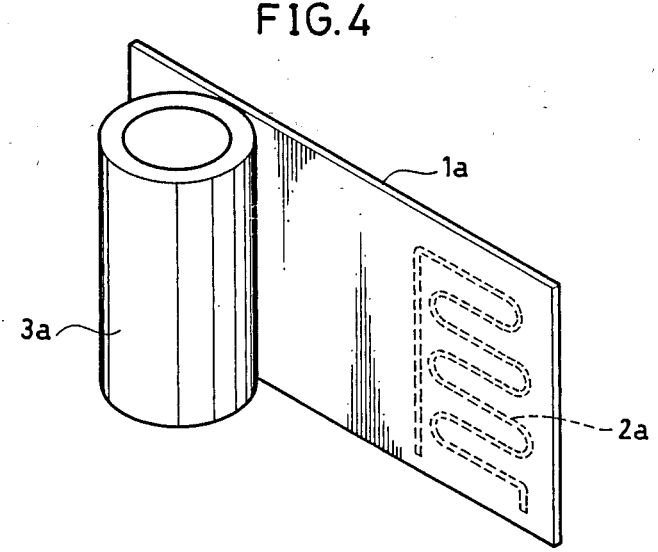
FIG. 4 is a perspective view showing the process of manufacturing the embodiment shown in FIG. 3.

OTHER EMBODIMENTS (a) Embodiments shown in FIGS. 3 and 4 can also implement the subject invention. Referring to FIGS. 3 and 4, members and parts corresponding to those of FIGS. 1 and 2 are indicated by the same reference numerals.

In the embodiment shown in FIG. 3, a platinum resistance pattern 2 is applied on the outer periphery of a ceramic sheet 1. Thus, lead wires 6 and 7 are directly connected to both ends of the platinum resistance pattern 2 by silver baking. The outer peripheral surface of the ceramic sheet 1 is covered with a glass layer 20. This glass layer 20 is adapted to protect the platinum resistance pattern 2 against deterioration caused by exposure to the atmosphere. In place of the glass coating layer 20, a ceramic slurry layer may be applied and fired to cover the platinum resistance pattern 2.

The embodiment shown in FIG. 3 is similar in function and effect to the embodiment of FIG. 1. The resistance of the platinum resistance pattern 2 can be adjusted by cutting the resistance adjusting lines 21, which are formed by silver baking in advance of provision of the glass coating layer 20, for example. After such resistance adjustment, the ceramic sheet 1 and the platinum resistance pattern 2 are covered with the glass coating layer 20. The process of manufacturing the platinum temperature sensor shown in FIG. 3 may be performed similarly to that of the embodiment shown in FIG. 2, except that the platinum paste pattern 2a is provided on the back surface of the ceramic green sheet 1a, as shown in FIG. 4.

In this case, there is no need to provide the through holes 4, 5, 8, 9 and 10 shown in FIG. 1. Further, since the platinum resistance pattern 2 is provided on the outer peripheral side, the platinum temperature sensor obtains excellent sensitivity. However, an additional step is required to provide the glass coating layer 20.

(b) Since the core 3 is not restricted to having a cylindrical shape, the core 3 may also be provided in the form of a column or a prism.

(c) Instead of the resistance adjusting lines 11, 12 and 21 which are formed in advance, and then cut for resistance adjustment in the embodiments shown in FIGS. 1 and 3, respective parts of the platinum resistance pattern 2 may be appropriately coupled by silver baking, thereby to adjust the resistance.

Figure 5:
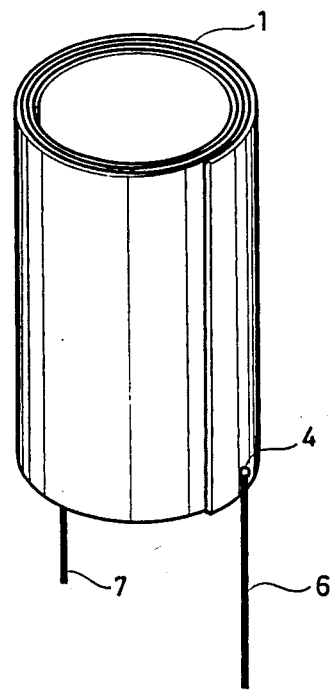
FIG. 5 is a perspective view showing still another embodiment of the present invention.

(d) A platinum temperature sensor may be provided by simply rolling up a green sheet 22, as shown in FIG. 5. Referring to FIG. 5, the green sheet 22 is wound on a core, (not shown), detached from the core and then fired to provide a platinum temperature sensor.

Figure 6:
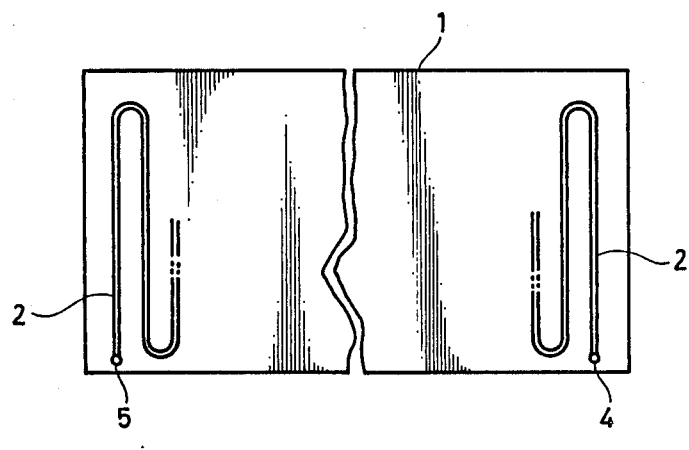
FIG. 6 illustrates an unrolled ceramic sheet of the embodiment shown in FIG. 5.

In the case shown in FIG. 5, a platinum resistance pattern 2 is formed substantially entirely over one major surface of a ceramic sheet 1 as shown in FIG. 6, to attain higher resistance. Also in this case, the resistance can be adjusted by appropriately providing resistance adjusting lines between bent portions of the platinum resistance pattern 2, or by cutting previously formed resistance adjusting lines, as a matter of course. Further, multiple ceramic sheet 1 may be rolled up together with the platinum resistance pattern 2 being inside or outside. When the platinum resistance pattern 2 is outwardly exposed, the exposed portion may be coated with glass or a ceramic slurry. Further, a core may be formed of a material such as resin to be dissipated upon firing, thereby to attain the structure shown in FIG. 5.

(e) Since the platinum resistance patterns 2 are not restricted to being those of the aforementioned embodiments, any arbitrary pattern may be employed in correspondence to the mode of application, as a matter of course. The pattern may be provided in the form of either a thin film or a thick film.

(f) The lead wires 6 and 7 may be integrally connected to the platinum resistance pattern 2 in the stage of firing the ceramic green sheet 1a. In this case, the lead wires 6 and 7 are made of a material having a high melting point, to withstand the temperature for firing the ceramic green sheet 1a.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A platinum temperature sensor comprising:
    a sensor body which includes multiple rolled plate-type ceramic sheets; and
    a platinum resistance pattern with at least two ends formed on a surface of at least one said ceramic sheet;
    wherein said multiple ceramic sheets are rolled up together in a green state and then cofired.

2. A platinum temperature sensor in accordance with claim 1, wherein a plurality of said ceramic sheets have respective platinum resistance patterns formed thereon and said patterns are rolled up with said multiple ceramic sheets before said cofiring.

3. A method of manufacturing a platinum temperature sensor comprising the steps of:
  forming a platinum resistance pattern having at least two ends on a surface of a green ceramic sheet; and
  rolling said ceramic sheet to form a sensor body.

4. A method as claimed in claim 3, wherein said platinum resistance pattern is formed on the inner surface of said ceramic sheet.

5. A method as claimed in claim 3, further comprising the steps of:
  forming through holes for lead wires in said ceramic sheet, said through holes being continuous with said ends of said platinum resistance pattern; and
  connecting said lead wires to said platinum resistance pattern from the exterior through said through holes.

6. A method as claimed in claim 3, further comprising the steps of:
  forming resistance adjusting lines on the outer surface of said ceramic sheet;
  forming a plurality of through holes from the exterior of said ceramic sheet to said platinum resistance pattern; and
  connecting said resistance adjusting lines to said platinum resistance pattern through said through holes.

7. A method as claimed in claim 3, wherein said platinum resistance pattern is formed at least partially with a zigzag configuration.

8. A method as claimed in claim 3, further comprising the steps of:
  winding said ceramic sheet on a central core in said rolling step; and
  cofiring said ceramic sheet with said central core.

9. A method as claimed in claim 3, further comprising the step of rolling at least one additional said ceramic sheet together with said ceramic sheet to form said sensor body.

10. A method as claimed in claim 9, further comprising the step of forming a respective platinum resistance pattern on said at least one additional green ceramic sheet.

11. A method as claimed in claim 10, further comprising a step of cofiring said two green ceramic sheets after they have been rolled.

12. A platinum temperature sensor produced in accordance with the method of claim 10.

13. A method as claimed in claim 9, further comprising a step of cofiring said two green ceramic sheets after they have been rolled.

14. A platinum temperature sensor produced in accordance with the method of claim 9.

15. A platinum temperature sensor produced in accordance with the method of claim 3.

16. A method as claimed in claim 3, further comprising a step of firing said green ceramic sheet after it has been rolled.

17. A method as claimed in claim 3, further comprising a step of forming the platinum resistance pattern to have a selected resistance value.

* * * * *